J. A. CAMP.
NUT-LOCK.
No. 184,336. Patented Nov. 14, 1876.
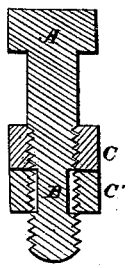
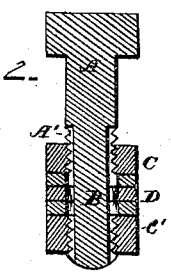
WITNESSES
INVENTOR

UNITED STATES PATENT OFFICE.

JACOB A. CAMP, OF SANDUSKY, OHIO.

IMPROVEMENT IN NUT-LOCKS.

Specification forming part of Letters Patent No. 184,336, dated November 14, 1876; application filed May 16, 1876.

*To all whom it may concern:*

Be it known that I, JACOB A. CAMP, of Sandusky, in the county of Erie and State of Ohio, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

My invention relates to an improvement in nut-locks; and consists in the combination of devices and appliances hereinafter set forth and claimed.

In the drawing, Figure 1 is a longitudinal sectional view of a bolt with nuts which illustrate my invention. Fig. 2 is a longitudinal sectional view illustrating a variation of my invention. Fig. 3 is a cross-section of the device shown in Fig. 2.

Heretofore, in localities where the bolt is subject to jar—as, for instance, in a fish-bar, or in bolts connected with machinery, or in the bolts employed to fasten the doors to oil-boxes of cars, and in other like localities—the nut is very liable to work loose, and to run off from the bolt and become lost.

The object of this invention is twofold: first, to prevent the nut from running off from the bolt, which is effected by forming a threadless recess in the bolt of a breadth slightly greater than the thickness of the nut, so that when the nut works along the thread until it reaches the threadless space, it will be held in this space without working farther off from the bolt. The second object to be accomplished is to effect a more perfect security by a jam-nut or "safety-nut," as it may be termed, by first running the ordinary nut upon the bolt until it passes the recess, then to run a jam-nut or safety-nut down beyond the recess until it jams against the nut in the ordinary way. If, however, the nuts should work loose so as to run off from the bolt, the jam-nut would soon fall into the threadless space and be stopped, and at the same time the regular nut would soon work against it and become again jammed, so that the nuts would not be lost.

A may be any ordinary bolt. B is a threadless space on the said bolt within that part of the bolt which is threaded. This space B is formed by recessing the bolt down at least to the shaft of the bolt, and the space is made, preferably, somewhat broader than the nut that is run upon the bolt. C is the nut. When employed alone it may be run down upon the bolt to the position shown in Fig. 1. If, then, it should work loose, it would pass no farther than the recess B, because, as soon as it strikes into the recess B, it is no longer impelled forward by the screw-thread, and the chances are very slight indeed that it should ever engage exactly with the screw-thread on the opposite side of the threadless space, and thus run off altogether from the bolt. Therefore, in many localities—as, for instance, upon the oil boxes of cars, where the nuts are frequently lost—the invention would be of great practical utility, inasmuch as the nut and bolt would not be lost, even though they might have worked loose.

C' is a jam-nut or safety-nut, which may be employed. In that case the nut C is run down on the bolt until it has passed the recess B. The jam-nut may then be run down over the recess B until it jams the nut C. If, then, the jam-nut C' should work loose, it could only pass back as far as, and fall into, the recess B, when it would give a double protection against the loss of the nut C. Or, this invention may be employed in another way: The nut C may be made regardless of the breadth of the space B, and reliance placed entirely upon the jam-nut C' and the space B. The only difference would be if, as we will presume, the nut C was made thicker than the breadth of the space B, that the jam-nut or safety-nut C' would alone, by falling into the space B, act as a safety-nut.

A variation of this invention is shown in Figs. 2 and 3, and is designed for employment where it is desirable to multiply many times the chances of securing the nut C. In this case the bolt A has longitudinal slots or grooves A', in addition to the threadless space or recess B.

D are washers, and are provided with tongues $d^1$ $d^2$, so that these washers, which may be termed "safety-washers," can only be slipped down into the recess or against the nut C by permitting the tongues $d^1$ $d^2$ to slide in the grooves or slots A'. When, therefore, they have reached the threadless space B, they may be turned to various positions in this space; and it is clearly apparent that the nut C cannot run off except all these washers be exactly registered, so that they may run off from the bolt A. The chances, however, are very materially lessened by making the tongues $d^1$ $d^2$, and their corresponding grooves A', of different breadths. Now, if the jam-nut C' is also employed, a most absolute security is effected.

When the nut C has run down in place, and the safety-nut C' then run down into the recess B, the nut C may be turned slightly back, tightening against the safety-nut. Or, a rubber or other flexible washer may be interposed between the safety-nut and the nut C.

What I claim is—

1. The nut-locking device, consisting of the bolt A, provided with the recess B, substantially as and for the purpose described.

2. The combination, with the bolt A, provided with recess B and the nut C, of the safety-nut C', substantially as and for the purpose described.

3. In combination with the bolt A, provided with recess B, the slots or grooves A', and safety-washers D, provided with tongue or tongues $d^1$ $d^2$, substantially as and for the purpose described.

4. The combination, with the bolt A, provided with recess B, the nut C, and washers D, of the jam-nut C', substantially as and for the purpose described.

In testimony whereof I have signed my name to this specification in the presence of two subscribing witnesses.

JACOB A. CAMP.

Witnesses:
 LLOYD DEWITT,
 E. B. MACKEY.